Jan. 22, 1935. B. E. BALDUF Re. 19,431

ACOUSTICAL WALL SUPPORT

Original Filed Oct. 11, 1926

Inventor

Bruno E. Balduf

L. A. Paley

Attorney

Reissued Jan. 22, 1935 Re. 19,431

UNITED STATES PATENT OFFICE 19,431

ACOUSTICAL WALL SUPPORT

Bruno E. Balduf, Chicago, Ill., assignor to United States Gypsum Company, Chicago, Ill., a corporation of Illinois Original No. 1,732,348, dated October 22, 1929, Serial No. 140,704, October 11, 1926. Application for reissue July 6, 1931, Serial No. 549,779

29 Claims. (Cl. 72—118)

This invention relates to a support for a wall or ceiling, and more particularly to the provision of an acoustical wall in which sounds are not transmitted directly by contact between rigid supporting members but rather to the provision of fibrous or other yielding means which permit the movement of the building or other support relative to the wall supports so that a connected continuous wall for example may be considered as floating relatively to its supporting structure but yet not directly in contact therewith so that sounds, impacts and the like are not directly transmitted from one to the other. In other words, this invention contemplates a flexible or yielding supporting clip which may be upheld by the ordinary studs, beams or even by brick work, the wall comprising a plain or plastered wall board of a fibrous nature or with a gypsum core, and an interposed flexible pad of felt or other fibrous or yielding material between members of said clip which will permit a limited movement or yielding motion of the wall and the supporting clip so that there will be less danger of cracking the wall itself, and to minimize the transmission of sounds and impacts therethrough. The invention consists in the novel construction, combination, and arrangement of the several parts.

Figure 1:
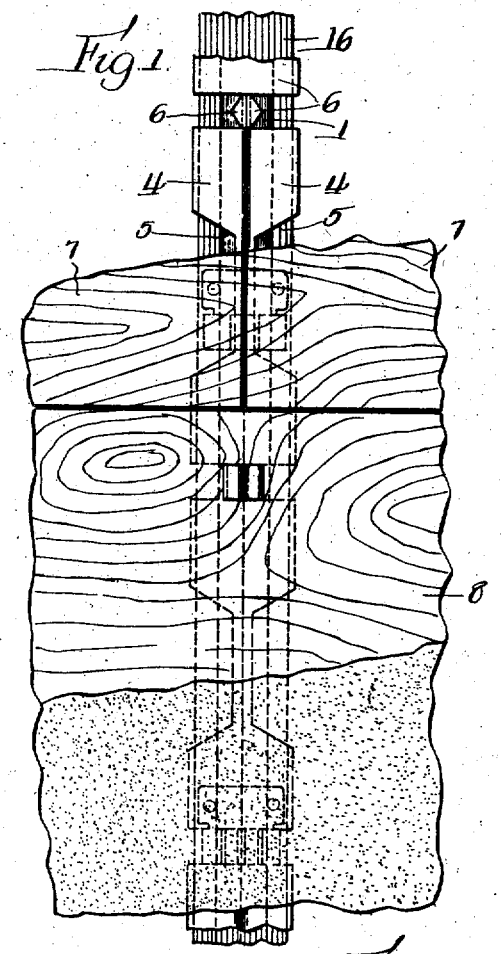
Figure 1 is a view in elevation of a wall and a supporting clip constructed in accordance with the principles of this invention.

In nailing laths or wall board directly to the opposite sides of studs, and plastering thereon, no means is provided for the direct transmission of sound from one room to the other and although partitions of this kind are somewhat deadened by introducing a filler between the upright studs, there still remains a direct connection between the walls which will transmit more or less of the sound from one room to the other, making this structure undesirable for modern types of buildings and the like. The present invention provides an interposed support between the wall which may be formed of wall board, either plastered or not, and the partition supporting studs or beams, are such that sounds will be dampened and will not be transmitted by a direct positive connection from the wall of one room to the wall of the adjacent room. The flexible or yielding connection in this case comprises a supporting clip having a portion for direct engagement with the partition support and another portion extending therefrom for engagement with the wall and an interposed strip or pad of fibrous material such as felt, which not only will take up and absorb the sounds which would ordinarily be transmitted through the partition studs, but also will provide a flexible means for engaging the wall supports so that the wall will not easily crack or become distorted.

Referring more particularly to the drawing, a sheet metal supporting member 1 is formed in strips of considerable length with a hollow annular body portion 2 the edges of which are bent together forming the webs 3 which are then bent at right angles and oppositely to form the flanges 4. These have cut outs 5 at intervals. In the cut out portions, the webs 3 are extended to form board supporting portions or prongs 6, the outer ends of which in the completed structure are bent at right angles to provide portions which engage with the faces of the boards and which extend parallel to the flanges 4. The extremities of prongs 6 may be left straight or may be bent over as desired and depending upon the material to which they are applied.

Figure 2:
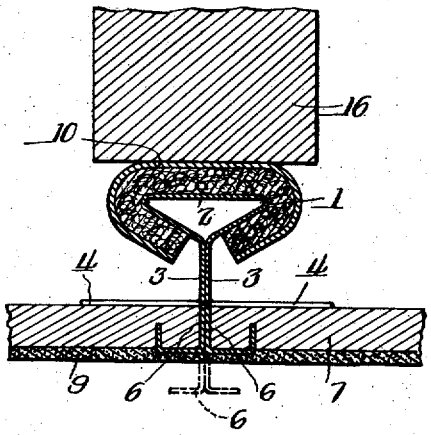
Figure 2 is a sectional view of a structure as shown in Figure 1.

If the pointed prongs 6 are to be inserted directly through a wall board such as fiber board or gypsum board the prongs are left straight and they are driven through the wall board by pounding it sharply on the outside as applied over the prongs; if the support is applied to a plaster board in which the edge of the board abuts the prongs 6, the extremities may be partially bent over so that when turned downwardly, the pointed ends thereof will engage any adjacent edge of the wall board 7, as shown in Figure 2. Where the wall boards are staggered with respect to each other, as shown in Figure 1, the prongs 6 may be inserted through one of the wall boards 8 and may be bent over them when the wall boards abut the prongs. In bending over the prongs 6 to engage the wall board, the rear face of the wall board is pressed firmly against the flanges 4 of the supporting strip 1 and after the wall board has thus been secured in place, a decorative coating 9 of plaster or the like may be applied to cover the surface of the wall board and also to cover the exposed portions of the prongs.

Figure 3:
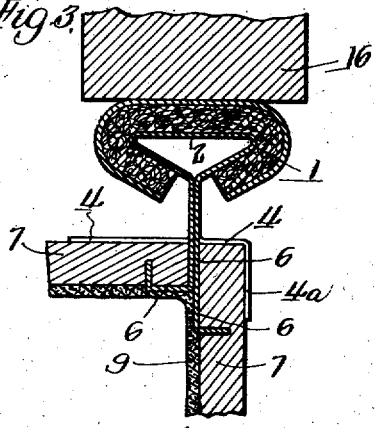
Figure 3 illustrates a structure of this kind as applied to the corner of a room.

When the supporting member 1 is located at the corner of a room, one of the flanges 4 is given a right angle bend 4[a] as shown in Figure 3 at a distance from the adjacent prong 6, substantially equal to the thickness of a wall board 7 which is to be supported thereby so that an angular backing is provided for the edge of one of the wall boards which is thereafter secured in place by bending the adjacent prong inwardly and thereafter covering the wall board and the prongs with a decorative coating 9.

Figure 4:
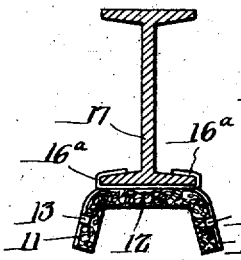
Figure 4 is a sectional view showing the application of the supporting plate of a clip to an I beam.
Figure 5:
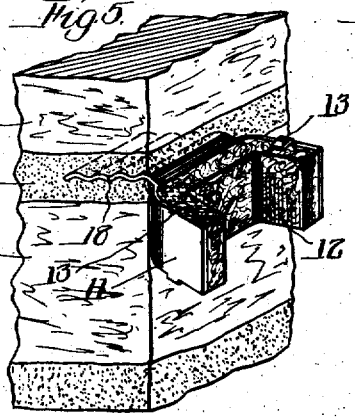
Figure 5 illustrates the attachment of another form of supporting plate to masonry or brick work.
Figure 6:
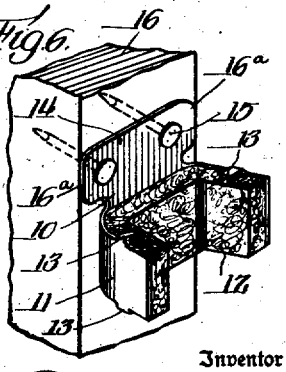
Figure 6 illustrates the application of a still further form of supporting plate to an ordinary building stud.

In order to hold the wall supports 1 yieldingly in position, a plurality of fastening or supporting plates 10 are provided, each comprising a flat metal backing extending at right angles to the ledge 3 having a portion 11 bent substantially in the form of an open U adapted to receive a correspondingly formed pad 12 of felt which may be held in place by lips 13 bendable over the edges of the felt pad and also by cementing the pad to the plate 10 and U-portion 11. An extension 14 of the flat metal backing which together comprise the supporting plate 10 is provided with perforations therethrough for fastening it by nails 15 or other fastening means to a supporting wall element or, as shown in the drawing, the studs 16 of a partition, and the extremities 16[a] of this plate 10 may be made sufficiently long so that they can be bent around the edges of an I-beam 17 as shown in Figure 4; or the plate may be bent at right angles and formed with ridges or corrugations 18, as illustrated in Figure 5, which may be inserted directly in a concrete wall or may be inserted in the mortar 19 between the bricks 20 of a wall.

These fastening or supporting plates 10 are readily applied to the partition studs, angle bars, or masonry walls of practically any building structure and they are easily applied in alignment so that a support 1 of considerable length may be applied thereto by simply placing the annular portion 2 in the U-shaped portion 11 of the supporting plates 10 and bending the extremities of the U-shaped portion 11 over the annular portion 2, as clearly illustrated in Figure 2. The cut-out portions 5 of the supporting strip are omitted for the purpose of making these bendable edges of the supporting plates more easily accessible, both for attaching them and for detaching them if it should be necessary.

With this construction it is apparent that the felt pads held to the supporting plates 10 insulate the wall supports from the free transmission of sound waves through a wall and partition thus formed. If in addition the decorative material 9 is an acoustical plaster, a very high percentage of the sound in any room is absorbed, first by the plaster itself then by the wall and its support and further by the dead air space within the partition. Ordinary acoustical plaster has the characteristic of absorbing high pitched sounds more efficiently than low pitched sounds. However by combining the yielding connection with the acoustical plaster, or other acoustical material, the combined effect is to absorb both the low pitched and high pitched sounds, thus insuring a more nearly uniform absorption of sound at all frequencies.

The result is that a practically sound proof wall is produced at a very little additional cost over the ordinary commonly used construction. Furthermore, there is a considerable give or relative movement possible between a wall thus supported and the fixed studs or partition supports and the wall thus supported will give rather than crack, due to the flexible connection between the members of the supporting clips. In effect, a wall of this kind is a separate floating structure and is unaffected by stresses and strains which are present in the settling action of any ordinary structure. Therefore a wall thus constructed is less likely to become cracked or disfigured. Metal lath may also be secured in place instead of plaster board or wall board by means of the prongs and plastered in the ordinary manner, or with acoustical plaster.

I claim:

1. An acoustical wall board suspension device to prevent direct transference of sound by a metal to metal contact, comprising a metal holder with spaced bendable sides, a fibrous pad, a wall board, and a sheet metal suspension member bent upon itself to form an angular head adapted to be inserted between the sides of the holder with the fibrous pad therebetween, and the bendable sides foldable over the head to enclose it and the pad thereby, the suspension member having prongs projecting from the head insertable through the wall board and bendable over at the tip to engage the face of wall board, a portion of the strip being bendable to engage the back of the wall board so that the wall board will be held in place by the strip.

2. A sheet metal wall suspension device for acoustical walls, comprising a metal holder with spaced bendable sides adapted to be fastened to a fixed support, a fibrous pad insertable in the holder, and a suspension member of sheet metal bent upon itself to form an angular head embraced by the pad and the bendable sides of the holder and having projecting strips with extremities insertable through a wall board and to engage the exposed face thereof with other bendable portions to engage the rear face of a wall board to form a backing therefor against which a wall board is held by the bent extremities which extend through the wall board.

3. An acoustical wall board support comprising a metal holder for attachment to a fixed support having spaced bendable sides, a fibrous pad insertable therein, and a sheet metal suspension member bent upon itself to form a head embraced by the pad and held by the bendable sides of the holder and having extremities insertable through a wall board and bendable to engage the exposed face thereof and other portions to engage the rear face of a wall board to form a backing therefor.

4. An acoustical wallboard support comprising a metal holder having bendable prongs adapted to be inserted through a wallboard and then bent at an angle to fasten said board to said holder, and cushioning means associated with said holder and adapted to be attached to a supporting wall element.

5. In an acoustical wall construction, a wall element, a cushioning member secured to said wall element, and bendable prongs associated with said cushioning member and adapted to be inserted through a wallboard and then bent at an angle to secure said wallboard to said cushioning member.

6. In an acoustical wall construction, a wall element, a bracket secured to said wall element, an attaching member yieldably supported by said bracket, a fibrous board associated with said attaching member, and bendable prongs on said attaching member and passing through said fibrous board to secure said board to said attaching member.

7. In a wall construction, a wall element, a wallboard in spaced relation to said wall element, a bracket attached to said wall element, and bendable prongs associated with said bracket and adapted to pass through said wallboard and be bent at an angle to attach said wallboard to said bracket and wall element.

8. A clip for supporting building structures, comprising a supporting ledge having a supporting plate mounted thereon and arranged at right angles to said ledge, said plate being apertured for the passage of nails to attach said plate directly and fixedly to a member of said building structure and oppositely disposed fingers to receive and retain the edges of plaster boards in association with said ledge.

9. In a building construction, a plurality of plaster boards in edge to edge abutting relation, a plurality of clips for engagement therewith, said clips comprising ledges having oppositely disposed fingers arranged to receive and retain the adjoining edges of said boards, and a metallic supporting plate associated with each of said ledges, said plates being apertured to receive nails for attaching said plate directly and fixedly to a wooden supporting member.

10. In a building construction, a plurality of building boards, arranged in a plane in edge to edge abutting relation, a plurality of clips for engagement therewith, said clips comprising ledges having outwardly extending, oppositely disposed fingers for receiving adjacent edges of said boards, an apertured supporting plate arranged to receive nails for connecting each of said ledges to a wood supporting member, and yielding means between each of said ledges and supporting plates.

11. In a building construction, a frame member, building panels in spaced, parallel relation to said frame member and having their edges arranged in abutting relation, acoustical material on the exposed face of said building panels, and yielding means connecting said frame member to said building panels so as to permit said panels to yield in a direction perpendicular to the plane thereof.

12. In a building construction, a frame member, a plurality of building panels in spaced parallel relation to said frame member, acoustical material on the exposed face of said panels, a plurality of clips connecting said panels to said frame member, and yielding sections associated with each of said clips to permit the vibration of said panels in a direction perpendicular to the plane thereof under the impact of sound waves on said acoustical material.

13. In a building structure, including a frame, a metal supporting ledge having integral flanges struck out therefrom, said flanges being arranged in parallel relation one to the other and being adapted to enclose the abutting edges of plaster boards for supporting said boards in a plane, and means yieldable in a direction perpendicular to the plane of said boards for connecting said supporting ledge to said frame.

14. A clip of the character stated comprising a flat supporting ledge having associated therewith a supporting plate arranged at right angles to said ledge and apertured for the passage of nails for attachment of the clip directly and fixedly to a wooden support, and oppositely disposed fingers to receive and retain the ends of plaster boards with respect to said ledge.

15. A clip of the character stated comprising a flat supporting ledge having associated therewith a supporting plate arranged at right angles to said ledge and apertured for the passage of nails for attachment of the clip directly and fixedly to a wooden support, and oppositely disposed parallel fingers, to receive and retain the ends of plaster boards with respect to said ledge.

16. A clip of the character stated comprising a flat supporting ledge, having associated therewith a supporting plate arranged at right angles to said ledge and apertured for the passage of nails for attachment of the clip directly and fixedly to a wooden support, and oppositely disposed fingers to receive and retain the ends of plaster boards with respect to said ledge, the said fingers being arranged in parallelism and at right angles to said supporting plate.

17. In a building construction, a masonry wall comprising a plurality of preformed building units separated by cementitious material, an attaching clip having a portion thereof comprised of a corrugated member embedded in said material, and means on said clip for supporting building panels in spaced relation to said wall.

18. In a building construction, a frame, a clip having outstanding, substantially parallel flanges forming channels for the reception of the adjoining edges of building panels so as to support said panels in a plane, said clip including a holder for resiliently connecting said clip to said frame so as to permit said frame to flex in a plane perpendicular to the plane of said panels and still prevent the cracking of a cementitious coating applied to the outer surface of said panels.

19. In building construction, frame studs; a plastic wall surface; furring to which said wall surface is secured; and loop means secured to the studs and loosely connecting the furring to the studs to permit movement of the studs relative to the wall surface.

20. Wall construction comprising studding, furring having laterally offset portions, plaster carrying lathing secured to the furring, and a loose connection between the studding and furring coacting with the offset portions of the latter to support the furring from the studding with the plaster spaced from the latter, while permitting relative movement between the studding and furring to prevent fracture of the plaster.

21. Wall construction comprising studding; furring; plaster carrying lathing secured to the furring with the plaster spaced from the latter; and a loose connection between the studding and furring coacting with the latter to support the furring from the studding and enabling the studding to move relative to the furring to prevent fracture of the plaster.

22. In a building construction, a building frame, a building panel in spaced relation to said frame, a bracket adjacent said frame and having nail holes, nails driven through said holes into said frame, the axes of said nails extending substantially perpendicularly to the plane of said panel, and an attaching member connected to said wall panel and yieldably but positively supported by said bracket in all positions thereof.

23. In a wall construction, a wall element, a wallboard in spaced relation to said wall element, a bracket attached to said wall element, and a manually bendable prong associated with said bracket and adapted to be bent at an angle in the course of erection of the construction to attach said wallboard to said bracket and wall element.

24. In a wall construction, a wall element, wallboards in spaced relation to said wall element with their edges in abutting relation to each other, a bracket attached to said wall element, and manually bendable prongs associated with said bracket and extending between the abutting edges of said wallboards and having projecting portions adapted to be bent at an angle in the course of erection of the construction to attach said wallboards to said bracket and wall element.

25. In a wall construction, a wall element, wallboards in spaced relation to said wall element with their edges in abutting relation to each other, a bracket attached to said wall element, and bendable prongs associated with said bracket and extending between the abutting edges of said wallboards and having projecting portions adapted to be bent at an angle to attach said wallboards to said bracket and wall element, said projecting portions being preformed with their extremities bent at an angle whereby said extremities are forced into the exposed faces of the wallboards when the remainder of the projecting portions are bent over for attachment of said wallboards.

26. In a building construction, a building element; a surfacing element in spaced relation thereto; an attaching member secured to said building element and comprising a backing plate portion, side portions extending forwardly therefrom, and edge portions turned inwardly from said side portions; and a supporting member comprising a portion embraced by said attaching member and secured in position by said in-turned edge portions of the latter, and integral prong portions extending into said surfacing element to support the latter in said spaced relation.

27. In a building construction, a building element; edge-abutting surfacing elements in spaced relation thereto; an attaching member secured to said building element and comprising a backing plate portion, side portions extending forwardly therefrom, and edge portions turned inwardly from said side portions; and a supporting member comprising a portion embraced by said attaching member and secured in position by said in-turned edge portions of the latter, a projecting portion extending between abutting edges of said surfacing elements, and integral prongs at the extremities of said projecting portions extending into said surfacing elements to support the latter in said spaced relation.

28. In a building construction, a building element; an acoustical surfacing element in spaced relation thereto; an attaching member secured to said building element and comprising a backing plate portion, side portions extending forwardly therefrom, and edge portions turned inwardly from said side portions; and a supporting element for said acoustical surfacing element comprising a portion embraced by said attaching member and secured in position by said in-turned edge portions of the latter.

29. In a building construction, a building element; a surfacing element in spaced relation thereto and having an acoustically treated exposed surface; an attaching member secured to said building element and comprising a backing plate portion, side portions extending forwardly therefrom, and edge portions turned inwardly from said side portions; and a supporting element comprising a portion embraced by said attaching member and secured in position by said in-turned edge portions of the latter, and integral prong portions extending into said surfacing element to support the latter in said spaced relation.

BRUNO E. BALDUF.